US010040262B2

(12) United States Patent
Jones et al.

(10) Patent No.: US 10,040,262 B2
(45) Date of Patent: Aug. 7, 2018

(54) EXPANDABLE BELT AND TREAD DRUM WITH VARIED CURVATURE SEGMENTS

(71) Applicant: Davian Enterprises, LLC, Greenback, TN (US)

(72) Inventors: William Jones, West Midlands (GB); Stuart J. Hassell, West Midlands (GB); Robert L. Marcus, Jr., Knoxville, TN (US)

(73) Assignee: Davian Enterprises, LLC, Greenback, TN (US)

(*) Notice: Subject to any disclaimer, the term of this patent is extended or adjusted under 35 U.S.C. 154(b) by 435 days.

(21) Appl. No.: 14/617,452

(22) Filed: Feb. 9, 2015

(65) Prior Publication Data

US 2015/0224728 A1 Aug. 13, 2015

Related U.S. Application Data

(60) Provisional application No. 61/937,105, filed on Feb. 7, 2014.

(51) Int. Cl.
*B29D 30/24* (2006.01)
*B29D 30/06* (2006.01)
*B29D 30/26* (2006.01)

(52) U.S. Cl.
CPC ............ *B29D 30/06* (2013.01); *B29D 30/24* (2013.01); *B29D 30/242* (2013.01); *B29D 2030/2642* (2013.01); *B29D 2030/2657* (2013.01)

(58) Field of Classification Search
CPC .......... B29D 30/242; B29D 2030/2642; B29D 2030/265; B29D 2030/2657
See application file for complete search history.

(56) References Cited

U.S. PATENT DOCUMENTS

| 1,233,567 | A | 7/1917 | Furry |
| 1,750,728 | A | 3/1930 | Robison |
| 2,168,897 | A | 8/1939 | Boswick |
| 2,201,469 | A | 5/1940 | Boswick |
| RE22,369 | E | 8/1943 | Boswick |

(Continued)

FOREIGN PATENT DOCUMENTS

| CA | 2188639 | 10/1996 |
| CA | 2219387 | 10/1997 |

(Continued)

OTHER PUBLICATIONS

Defintion of "integral" from "http://www.dictionary.com/browse/integral", retrieved Oct. 11, 2017.*

(Continued)

*Primary Examiner* — Geoffrey L Knable
(74) *Attorney, Agent, or Firm* — Pitts & Lake, P.C.

(57) ABSTRACT

An improved belt and tread drum incorporating an improved segment is disclosed. Segments are mounted in side-by-side relationship about a central axis for radial movement inwardly and outwardly with respect to the central axis and include arcuate outer surfaces that collectively define an outer circumferential working surface of the drum. The segments each define an arcuate outer surface defining a circumferential dimension, the outer surface having varied curvature along the circumferential dimension.

16 Claims, 10 Drawing Sheets

(56) References Cited

U.S. PATENT DOCUMENTS

| | | |
|---|---|---|
| 2,335,169 A | 11/1943 | Boswick |
| 2,353,767 A | 7/1944 | Schnedarek |
| 2,367,831 A | 1/1945 | Manson |
| 2,529,861 A | 11/1950 | Angell et al. |
| 2,614,057 A | 10/1952 | Ericson et al. |
| 2,699,198 A | 1/1955 | Balzhiser |
| 2,715,932 A | 8/1955 | Frazier |
| 2,728,616 A | 12/1955 | Potter |
| 3,077,918 A | 2/1963 | Noall |
| 3,101,289 A | 8/1963 | Giletta et al. |
| 3,111,444 A | 11/1963 | Poulliloux |
| 3,111,445 A | 11/1963 | Poulliloux et al. |
| 3,140,216 A | 7/1964 | Shilts et al. |
| 3,207,648 A | 9/1965 | Shilts |
| 3,346,434 A | 10/1967 | Fulton |
| 3,366,526 A | 1/1968 | Winslow |
| 3,375,154 A | 3/1968 | Ruttenberg et al. |
| 3,405,023 A | 10/1968 | Eckenwiler et al. |
| 3,408,244 A | 10/1968 | Frazier |
| 3,485,700 A | 12/1969 | Cooper et al. |
| 3,489,634 A | 1/1970 | Pizzo et al. |
| 3,507,528 A | 4/1970 | Desmarchais |
| 3,547,733 A | 12/1970 | Leblond |
| 3,598,673 A | 8/1971 | Caretta |
| 3,644,162 A | 2/1972 | Appleby et al. |
| 3,676,261 A | 7/1972 | Appleby et al. |
| 3,694,290 A | 9/1972 | Pacciarini et al. |
| 3,695,974 A | 10/1972 | Henley |
| 3,784,426 A | 1/1974 | Woodhall et al. |
| 3,787,262 A | 1/1974 | Appleby et al. |
| 3,816,218 A | 6/1974 | Felten |
| 3,833,444 A | 9/1974 | Mallory |
| 3,837,968 A | 9/1974 | Marra |
| 3,867,229 A | 2/1975 | Marra |
| 3,873,398 A | 3/1975 | Yokoo et al. |
| 3,887,423 A | 6/1975 | Gazuit |
| 3,929,546 A | 12/1975 | Katagiri et al. |
| 3,932,256 A | 1/1976 | Touchette |
| 3,948,717 A | 4/1976 | Suzuki et al. |
| 4,010,058 A | 3/1977 | Kubinski et al. |
| 4,105,487 A | 8/1978 | Suzuki et al. |
| 4,126,507 A | 11/1978 | Kim et al. |
| 4,131,500 A | 12/1978 | Wilde et al. |
| 4,149,927 A | 4/1979 | Lauer, Jr. |
| 4,151,035 A | 4/1979 | Jellison |
| 4,155,796 A | 5/1979 | Rambacher |
| 4,210,482 A | 7/1980 | Collins |
| 4,220,494 A | 9/1980 | Kawaida et al. |
| 4,230,517 A | 10/1980 | Enders |
| 4,239,579 A | 12/1980 | Felten et al. |
| 4,292,112 A | 9/1981 | Kumagai |
| 4,312,696 A | 1/1982 | Bryant |
| 4,324,604 A | 4/1982 | Alexander et al. |
| 4,325,764 A | 4/1982 | Appleby et al. |
| 4,392,899 A | 7/1983 | Bertoldo |
| 4,425,180 A | 1/1984 | Samokhvalov et al. |
| 4,436,574 A | 3/1984 | Long et al. |
| 4,445,962 A | 5/1984 | Felder |
| 4,469,546 A | 9/1984 | Klose et al. |
| 4,472,233 A | 9/1984 | Fukamachi et al. |
| 4,473,427 A | 9/1984 | Irie |
| 4,510,012 A | 4/1985 | Kawaida et al. |
| 4,519,279 A | 5/1985 | Ruggeri |
| 4,521,269 A | 6/1985 | Ozawa |
| 4,547,251 A | 10/1985 | Landsness |
| 4,582,557 A | 4/1986 | Enders |
| 4,626,302 A | 12/1986 | Casey et al. |
| 4,636,277 A | 1/1987 | Owen et al. |
| 4,729,541 A | 3/1988 | Maier |
| 4,780,171 A | 10/1988 | Byerley |
| 4,798,647 A | 1/1989 | Haas |
| 4,861,123 A | 8/1989 | Russell |
| 4,861,173 A | 8/1989 | Kemp |
| 5,047,108 A | 9/1991 | Byerley |
| 5,066,354 A | 11/1991 | Benjamin |
| 5,071,498 A | 12/1991 | Nishiide et al. |
| 5,078,819 A | 1/1992 | Sergel et al. |
| 5,089,077 A | 2/1992 | Byerley |
| 5,203,947 A | 4/1993 | Boeker |
| 5,223,074 A | 6/1993 | Miyanaga et al. |
| 5,225,028 A | 7/1993 | Bierens |
| 5,232,542 A | 8/1993 | Norjiri et al. |
| 5,264,068 A | 11/1993 | Masuda |
| 5,320,701 A | 6/1994 | Jellison et al. |
| 5,354,405 A | 10/1994 | Byerley |
| 5,380,384 A | 1/1995 | Tokunaga et al. |
| 5,441,587 A | 8/1995 | Byerley |
| 5,505,803 A | 4/1996 | Byerley |
| 5,558,733 A | 9/1996 | Byerley |
| 5,618,374 A | 4/1997 | Byerley |
| 5,634,745 A * | 6/1997 | Wiman ............... B23B 27/141 407/113 |
| 5,635,016 A | 6/1997 | Byerley |
| 5,709,768 A | 1/1998 | Byerley |
| 5,735,995 A | 4/1998 | Bull et al. |
| 5,755,922 A | 5/1998 | Baldoni et al. |
| 6,004,250 A | 12/1999 | Byerley |
| 6,007,268 A | 12/1999 | Whittington et al. |
| 6,013,147 A | 1/2000 | Byerley |
| 6,058,999 A | 5/2000 | Roberts et al. |
| 6,117,269 A | 9/2000 | Pizzorno |
| 6,152,645 A | 11/2000 | Sanford |
| 6,238,292 B1 | 5/2001 | Pelkey |
| 6,390,166 B1 * | 5/2002 | Roberts ............... B29D 30/24 156/415 |
| 6,457,505 B1 | 10/2002 | Byerley |
| 6,539,998 B2 | 4/2003 | Sergel et al. |
| 6,571,682 B2 | 6/2003 | Roberts et al. |
| 6,585,022 B1 | 7/2003 | Rex |
| 6,602,372 B1 | 8/2003 | Byerley |
| 6,673,183 B2 | 1/2004 | Byerley |
| 6,793,752 B2 | 9/2004 | Lemaire et al. |
| 7,000,905 B1 | 2/2006 | Lutter et al. |
| 7,287,772 B2 | 10/2007 | James |
| 7,288,160 B2 | 10/2007 | Roedseth et al. |
| 7,637,665 B2 | 12/2009 | Cook |
| 7,699,952 B2 | 4/2010 | Linne et al. |
| 7,837,816 B2 | 11/2010 | Lilnne et al. |
| 8,056,597 B2 | 11/2011 | Byerley |
| 8,091,602 B2 | 1/2012 | Roberts et al. |
| 8,272,417 B2 | 9/2012 | Painter |
| 8,555,944 B2 | 10/2013 | Painter |
| 2003/0197389 A1 | 10/2003 | Moiianen et al. |
| 2006/0000554 A1 | 1/2006 | Kitz et al. |
| 2008/0202690 A1 | 8/2008 | Painter |
| 2010/0101732 A1 | 4/2010 | Howley et al. |
| 2010/0186864 A1 | 7/2010 | Koopman et al. |
| 2011/0303366 A1 | 12/2011 | Byerley |
| 2012/0017720 A1 | 1/2012 | Painter |
| 2012/0033906 A1 | 2/2012 | Painter |
| 2012/0090787 A1 | 4/2012 | Jones et al. |
| 2012/0168087 A1 | 7/2012 | Byerley |
| 2012/0222822 A1 | 9/2012 | Jones et al. |
| 2012/0256434 A1 | 10/2012 | Roberts et al. |
| 2013/0008611 A1 | 1/2013 | Marcus et al. |
| 2014/0116601 A1 * | 5/2014 | Bormann ............ B60C 19/002 156/117 |

FOREIGN PATENT DOCUMENTS

| | | |
|---|---|---|
| CA | 2142004 | 4/2006 |
| DE | 19913241 | 9/2000 |
| DE | 102009025759 | 11/2010 |
| EP | 1688240 | 11/2004 |
| EP | 1621327 | 6/2005 |
| JP | 57-154323 A * | 9/1982 |
| JP | S60196330 | 10/1985 |
| JP | 2009274392 | 11/2009 |
| MX | 200554 | 1/2001 |
| WO | WO2001/007242 | 11/2001 |
| WO | WO2006/003058 | 1/2006 |
| WO | WO2008/025598 | 3/2008 |
| WO | WO2010/052103 | 5/2010 |

(56) References Cited

FOREIGN PATENT DOCUMENTS

| WO | WO2011/159343 | 12/2011 |
| WO | WO2012/021160 | 2/2012 |
| WO | WO2012/031193 | 3/2012 |

OTHER PUBLICATIONS

Patent Copperation Treaty, International Search Report, dated May 15, 2015; Form PCT/ISA/220 (dated Jul. 2014).
European Patent Office, Supp'l European Search Report; EPO Form 1507S; dated Oct. 8, 2017.

* cited by examiner

US 10,040,262 B2

EXPANDABLE BELT AND TREAD DRUM WITH VARIED CURVATURE SEGMENTS

CROSS-REFERENCE TO RELATED APPLICATIONS

This application claims the benefit of U.S. Provisional Patent Application No. 61/937,105, filed on Feb. 7, 2014.

STATEMENT REGARDING FEDERALLY-SPONSORED RESEARCH OR DEVELOPMENT

Not Applicable

BACKGROUND OF THE INVENTION

1. Field of Invention

The present general inventive concept relates to devices that are useful in the manufacture of vehicle tires. More particularly, the present general inventive concept relates to an improved belt and tread drum having segments defining varied curvature.

2. Description of the Related Art

The manufacture of a vehicle tire commonly includes the steps of forming a tire carcass, forming a toroid-shaped belt and tread "package" of the tire separately from the carcass, and thereafter marrying the belt and tread package to the tire carcass to form a "green" tire. The green tire is thereafter treated to form the tread and various other features of a finished tire. Other supplementary steps, such as bonding the belt and tread package to the tire carcass (often referred to as "stitching" the belt and tread package), may be performed during the course of, or following, one or more of the aforementioned steps.

The formation of a tire carcass is typically performed using a tire building drum, of the type described in U.S. Pat. No. 6,457,505. Such a tire building drum typically defines a radially expandable and contractible cylindrical working surface upon which a tire carcass is formed. Subsequent to the formation of the tire carcass on the cylindrical working surface, such tire carcass may be transferred to an expansion drum, of the type discussed in U.S. Pat. No. 6,602,372. The tire carcass is positioned surrounding the expansion drum, and a portion of the tire carcass is overlaid with the belt and tread package. The tire carcass is then inflated to a toroid shape resembling, though often not identical to, the shape of a finished tire. While the tire carcass is inflated, the belt and tread package is joined to the tire carcass.

Formation of a belt and tread package of a tire is typically accomplished using a belt and tread drum, of the type disclosed in U.S. Pat. No. 6,013,147. Such a belt and tread drum typically has an outer cylindrical surface, or circumference, comprising a plurality of elongated segments, about which one or more layers of the tire belt material (comprising, for example, reinforcement cords embedded in a polymeric binder) are laid to define the belt and tread package. The circumference of the belt and tread drum is preferably capable of expanding and contracting to allow, for example, removal of a completed belt and tread package from the drum. A completed belt and tread package is typically essentially nonexpandable radially. However, a completed belt and tread package is typically flexible to the extent that, when unsupported, the toroid-shaped belt and tread package will deform and sag under the influence of gravity. Also, desirably, the adjustable circumference of the belt and tread drum enables a single drum to be used to form belt and tread packages of alternative diameters.

During formation of the belt and tread package on the belt and tread drum, it is not uncommon for the belt and tread drum and accompanying tooling to be configured such that the elongated segments of the belt and tread drum apply considerable pressure to interior surfaces of the belt and tread package, in part to assist in maintaining a uniform toroid shape of the tire component during formation. Such high pressures applied to the interior surfaces of the tire component can result in at least a portion of the arced exterior surfaces of the elongated segments becoming at least partially imprinted in the tire component, resulting in the formation of very slight imprints of the arcuate exterior surfaces of the elongated segments, and corresponding very slight bulges adjacent the imprints, in the tire component. Further, it is known that the radius of curvature of the various arcuate segments forming the belt and tread drum's outer cylindrical surface is fixed by the rigidity of the segments, thus rendering it impossible for the segments to be moved between radially expanded and contracted positions and collectively provide perfectly-formed cylindrical surfaces at each of these two positions. If, for example, the circumference of the drum is adjusted to a size at which the segments are positioned at a distance from the longitudinal axis which exceeds the radius of curvature of each segment arc, there will exist regions about the drum circumference where the circumferentially outward edges of the segments curve slightly radially inwardly from the central portions of the segments. Conversely, if the circumference of the drum is adjusted to a size at which the segments are positioned at a distance from the longitudinal axis less than the radius of curvature of each segment arc, there will exist regions about the drum circumference where the circumferentially outward edges of the segments project slightly radially outwardly from the central portions of the segments. In either case, the outer circumference of the belt and tread drum will be very slightly out of round. If these out of round regions are large enough (as may occur, for example, when the drum is expanded to allow manufacture of a tire of relatively large diameter), it is possible that the drum may produce undesirable alternating imprints and bulges of the slightly out-of-round exterior surface of the tire building drum on a tire constructed with the drum. Such imprints and bulges are undesirable in that they may later manifest as irregularities in a finished tire, which may, in certain circumstances, produce undesirable effects, such as for example vibration, noise, and/or resonance of the rolling tire.

In light of the above, an improved segment for a belt and tread drum, and a belt and tread drum which includes features for limiting deviation from the general cylindrical shape of the drum throughout expansion and contraction of the drum, thereby limiting the development of vibration, noise, and/or resonance of a tire manufactured using the belt and tread drum, are desired.

BRIEF SUMMARY OF THE INVENTION

The present general inventive concept, in various example embodiments, provides a segment which may be useful in defining a portion of an outer circumferential working surface of a tire building drum. The segment has an arcuate outer surface defining a circumferential dimension. In various embodiments, the outer surface has varied curvature along the circumferential dimension. For example, in various embodiments, the outer surface may define a plurality of regions, each region extending along a longitudinal dimension of the segment. Each region may have a curvature along a circumferential dimension of the segment that differs from a curvature of an adjacent region.

In various embodiments, the plurality of regions may comprise a first region extending along a circumferentially central portion of the segment. The first region may have a first radius of curvature. The plurality of regions may further comprise a second region extending circumferentially adjacent the first region, the second region having a second radius of curvature greater than the first radius of curvature. The plurality of regions may further comprising a third region extending circumferentially adjacent the first region opposite the second region, the third region having a radius of curvature conforming to the second radius of curvature. The plurality of regions may further comprise a fourth region extending circumferentially adjacent the second region opposite the first region, the fourth region having a third radius of curvature greater than the second radius of curvature. The plurality of regions may further comprising a fifth region extending circumferentially adjacent the third region opposite the first region, the fifth region having a radius of curvature conforming to the third radius of curvature. The plurality of regions may further comprise a sixth region extending circumferentially adjacent the fourth region opposite the second region, the sixth region having a fourth radius of curvature less than the third radius of curvature. The plurality of regions may further comprise a seventh region extending circumferentially adjacent the fifth region opposite the third region, the seventh region having a radius of curvature conforming to the fourth radius of curvature.

In various embodiments, each of the plurality of regions may extend tangentially to an adjacent region, such that the overall arcuate shape of the outer surface is smooth. In other embodiments, each region may define a transition curve along an interface of the region with an adjacent region. In these embodiments, each transition curve may provide a smooth transition between the radius of curvature of that region and the radius of curvature of the adjacent region.

In various embodiments, the outer surface may define opposite first and second side margins extending along the longitudinal dimension, each side margin defining a plurality of alternating slots and fingers extending along the circumferential dimension of the outer surface. In certain embodiments, the second, fourth, and sixth regions may be defined by the fingers of the first side margin, and the third, fifth, and seventh regions may be defined by the fingers of the second side margin.

The present general inventive concept, in various example embodiments, further provides a belt and tread drum for use in the manufacture of vehicle tires. The belt and tread drum may, in various embodiments, comprise a plurality of segments mounted in side-by-side relationship about a central axis for radial movement inwardly and outwardly with respect to the central axis. Each segment may define an arcuate working surface, the working surfaces collectively defining a circumferential working surface of the drum, and each working surface may have varied curvature along a circumferential dimension of the working surface. For example, similar to the above-discussed segment, each working surface of each segment about the drum may define a plurality of regions, each region extending along a longitudinal dimension of the working surface, and each region having a curvature along the circumferential dimension of the working surface that differs from a curvature of an adjacent region.

In various embodiments, each plurality of regions of each working surface may comprise a first region extending along a circumferentially central portion of the working surface, a second region extending circumferentially adjacent the first region, and a third region extending circumferentially adjacent the first region opposite the second region. The first region may have a first radius of curvature, and the second and third regions may have a second radius of curvature greater that the first radius of curvature. In certain embodiments, each plurality of regions of each working surface may further comprise a fourth region extending circumferentially adjacent the second region opposite the first region, and a fifth region extending circumferentially adjacent the third region opposite the first region. The fourth and fifth regions may have a third radius of curvature greater that the second radius of curvature. In certain embodiments, each plurality of regions of each working surface may further comprise a sixth region extending circumferentially adjacent the fourth region opposite the second region and a seventh region extending circumferentially adjacent the fifth region opposite the third region. The sixth and seventh regions may have a fourth radius of curvature less than the third radius of curvature. In various embodiments, each working surface may define a smooth transition between each of the plurality of regions of the working surface.

In some embodiments, each working surface may define opposite first and second side margins extending along a longitudinal dimension of the working surface. Each side margin may define a plurality of alternating slots and fingers extending along the circumferential dimension of the working surface, each finger of each first side margin being sized and shaped to at least partially mate with a corresponding slot of a second side margin of an adjacent segment, and each slot of each the first side margin being sized and shaped to at least partially mate with a corresponding finger of a second side margin of an adjacent segment. In certain embodiments, the second, fourth, and sixth regions of each working surface may be defined by the fingers of the first side margin of the working surface, and the third, fifth, and seventh regions of each working surface may be defined by the fingers of the second side margin of the working surface.

Additional aspects and advantages of the present general inventive concept will be set forth in part in the description which follows, and, in part, will be obvious from the description, or may be learned by practice of the present general inventive concept.

BRIEF DESCRIPTION OF THE SEVERAL VIEWS OF THE DRAWINGS

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION OF THE INVENTION

Figure 1:
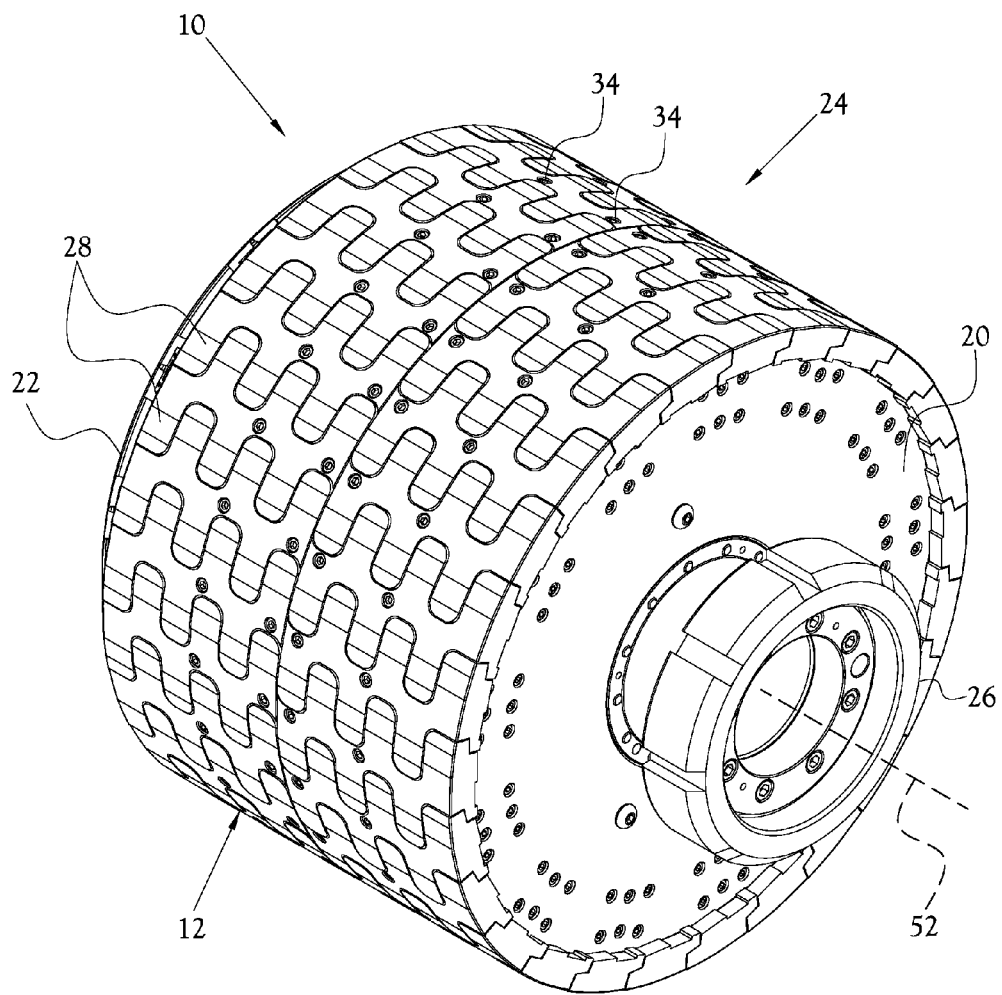
FIG. 1 is a perspective view showing one embodiment of an expandable belt and tread drum with varied curvature segments constructed in accordance with several features of the present general inventive concept.

Reference will now be made to the example embodiments of the present general inventive concept, examples of which are illustrated in the accompanying drawings and illustrations. The example embodiments are described herein in order to explain the present general inventive concept by referring to the figures. The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Referring now to the Figures in which like reference numerals indicate like or corresponding features, there is shown in FIGS. 1-5 a belt and tread drum 10 within which features of the present general inventive concept are embodied. The belt and tread drum 10, or "drum," defines generally an outer circumference comprising a plurality of arcuate, circumference-defining segments 28 arranged in a side-by-side relationship to form an outer circumferential working surface 12 of the drum 10. The segments 28 are mounted such that they may be moved radially inward and outward toward and away from a centerline 52 of the drum 10. Thus, the outer working surface 12 of the drum 10 is capable of expanding to various diameters to accommodate the construction of belt and tread packages for tires of different diameters. Therefore, when tires of various sizes need to be made on a given, or single, drum, the diameter of the circumference of the drum 10 may be adjusted accordingly. Additionally, the drum is able to be collapsed from an expanded condition to permit the belt and tread package to be removed for transfer to a subsequent stage of the tire making process. As will further be discussed below, in various embodiments, each of the segments 28 of the drum defines an outer surface having varying curvature along a circumferential dimension of the segment 28. Thus, as the outer working surface 12 of the drum 10 is expanded and collapsed, various portions of the outer surface of the segment 28 are brought into and out of conformity with the general cylindrical shape of the outer working surface 12 of the drum 10, thereby limiting deviation from the general cylindrical shape throughout expansion and contraction of the drum 10.

With reference to FIGS. 1-5, the belt and tread drum 10 is generally of cylindrical geometry, defining respective longitudinal, radial, and circumferential dimensions. The depicted drum 10 includes generally first and second disc-shaped end plates 20 and 22, respectively, disposed at respective longitudinal ends of the drum 10, and a central body portion, indicated generally by the numeral 24, which is disposed between the end plates 20 and 22. The body portion 24 is made up of a plurality of relatively movable components, the sum of whose movements results in controlled and measured change in the outer circumference of the body portion 24 to accommodate the manufacture of tires of various sizes (i.e. tires of different diameters). Selection and control over the maximum circumference of the drum is provided for externally of the drum by means of an adjustment mechanism 26.

Figure 2:
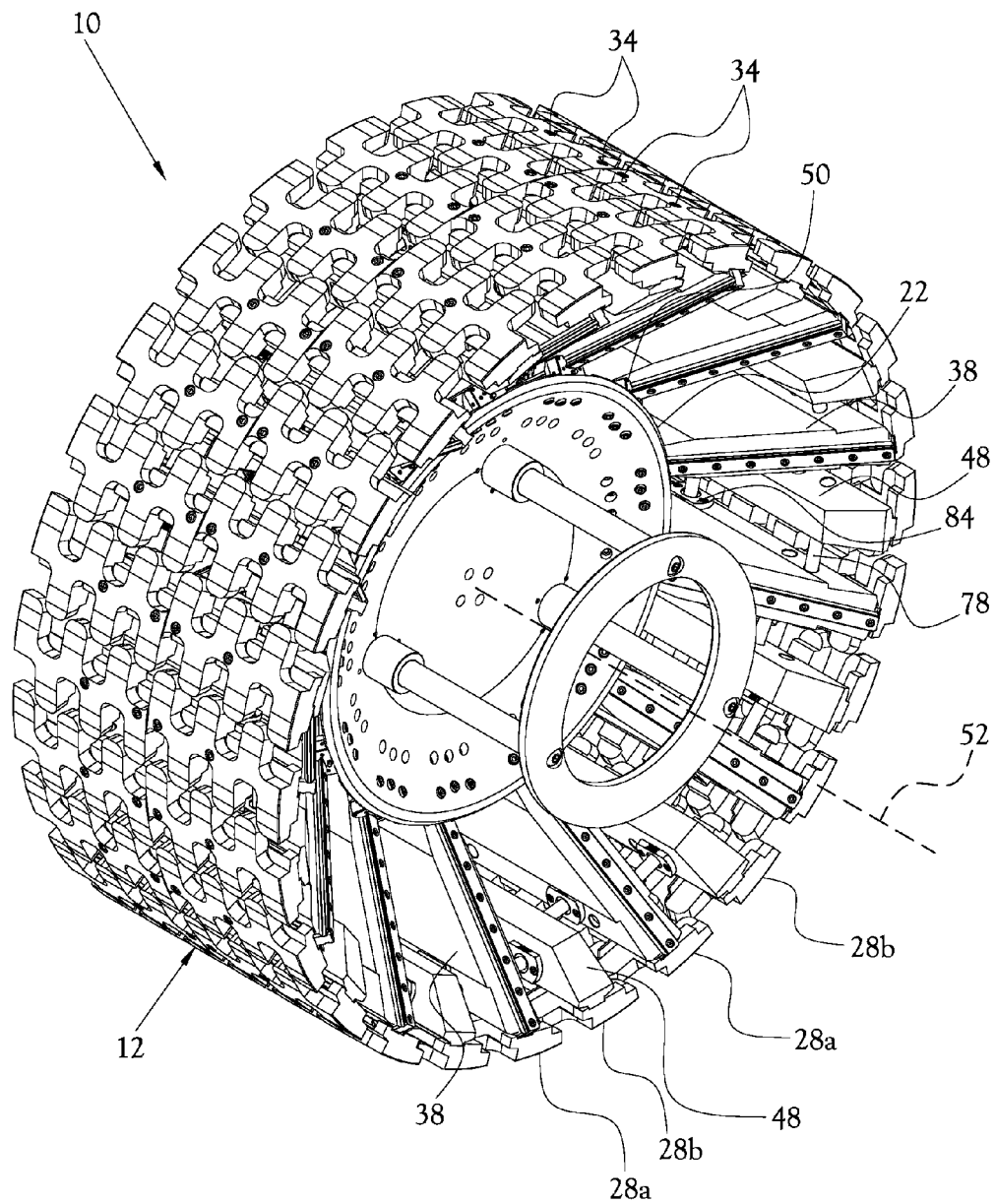
FIG. 2 is another perspective view of the expandable belt and tread drum of FIG. 1, showing the drum in an expanded position.
Figure 3:
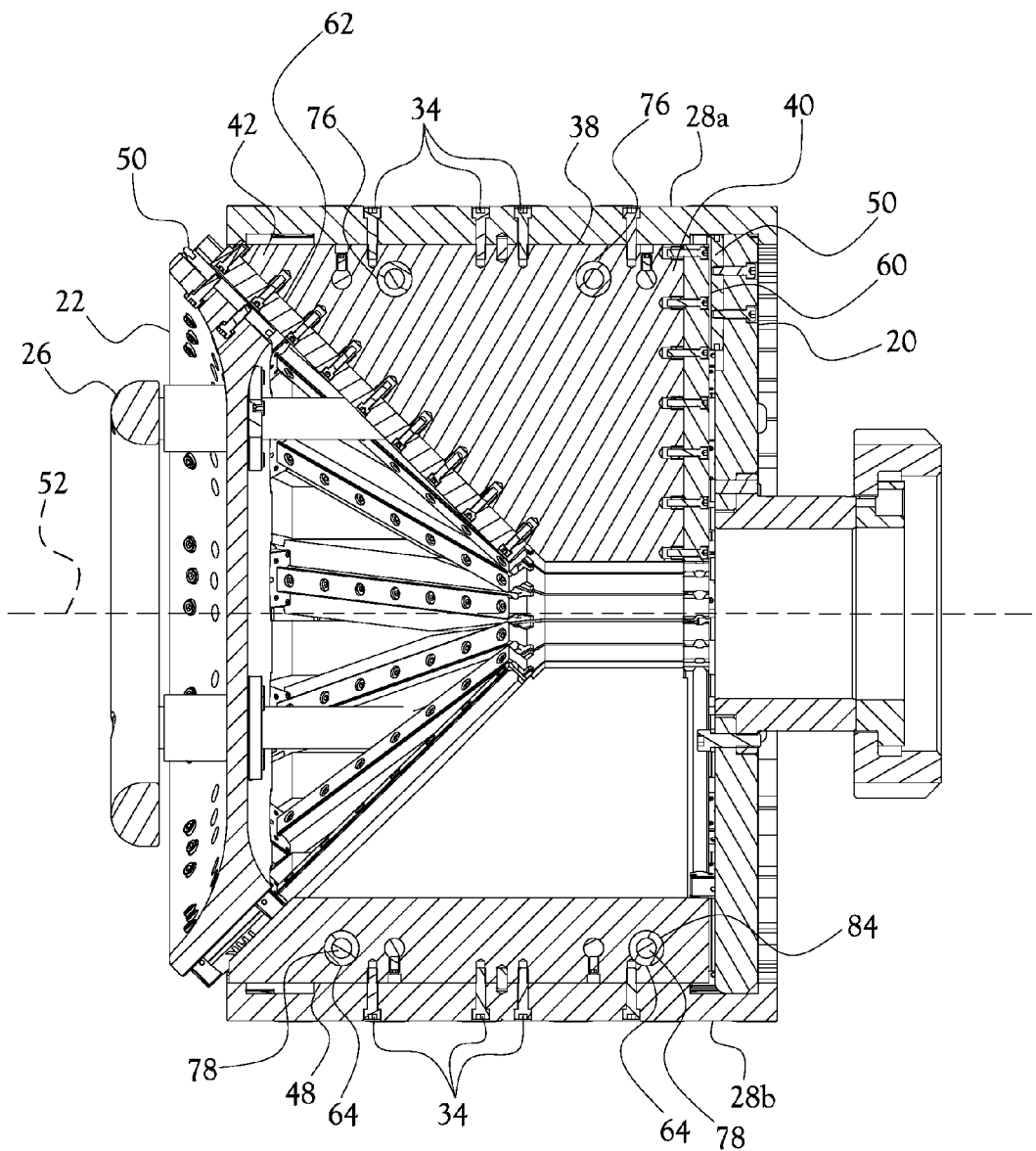
FIG. 3 is a cross-sectional side view of the expandable belt and tread drum of FIG. 1, showing the drum in a collapsed position.
Figure 4:
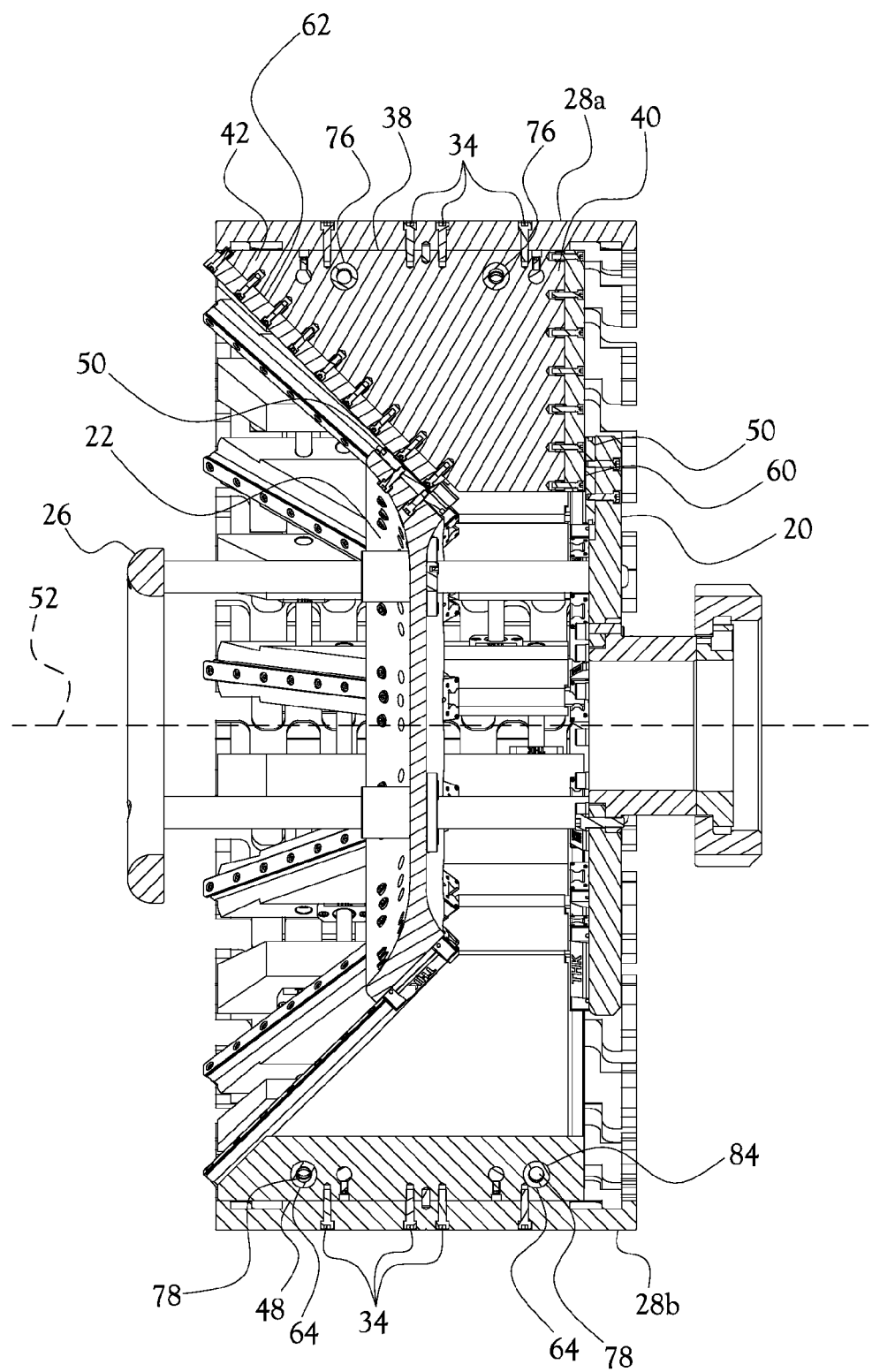
FIG. 4 is another cross-sectional side view of the expandable belt and tread drum of FIG. 1, showing the drum in an expanded position.

More specifically, the body portion 24 of the depicted belt and tread drum 10 includes a plurality of circumference-defining segments 28 whose outer arcuate surfaces collectively define an outer circumferential working surface of the drum 10. In the illustrated embodiment, the various segments 28 about the circumference of the drum 10 are grouped into a first set of segments 28a, and a second set of segments 28b, (see FIG. 2) with the segments of the sets 28a, 28b alternating about the circumference of the working surface 12, such that a pair of segments 28a of the first set lie immediately circumferentially adjacent, and on opposite longitudinal sides of, each segment 28b of the second set, and vice-versa. Each segment 28a of the first set of segments is joined, as with the illustrated bolts 34, a weld, integral connection, or the like, to a planar cam element 38 disposed radially inwardly of the segment 28a. With reference to FIGS. 3 and 4, each cam element 38 defines two opposite side ends 40, 42 extending radially outwardly from the longitudinal centerline 52 of the drum 10. In the illustrated embodiment, each side end 40, 42 of each cam element 38 defines a track 60, 62 that is slidably engaged by an associated radially-extending cam member 50. The various cam members 50 are provided at regular, spaced apart locations about respective circumferential perimeters of the inner surfaces of the opposite end plates 20 and 22.

In various embodiments, each of the cam elements 38 defines an inwardly-tapered shape along a radial dimension thereof, such that respective radially-inward ends of corresponding tracks 60, 62 are closer to one another than respective radially-outward ends. Thus, movement of the first and second end plates 20, 22 toward one another results in expansion of the cam elements 38 and associated segments 28 axially away from the longitudinal centerline 52 of the drum 10, while movement of the first and second end plates 20, 22 away from one another results in contraction of the cam elements 38 and associated segments 28 axially toward the longitudinal centerline 52 of the drum 10. For example, in the illustrated embodiment, the cam members 50 associated with the first end plate 20 and the corresponding tracks 60 associated with the first side ends 40 of the cam elements 38 each extend directly radially outwardly, at substantially right angles to the longitudinal centerline 52 of the drum 10, while the cam members 50 associated with the second end plate 22 and the corresponding tracks 62 associated with the second side ends 42 of the cam elements 38 each extend at an angle both radially and longitudinally outwardly, at acute angles to the longitudinal centerline 52 of the drum 10. In this configuration, each cam element 38 defines a generally trapezoidal shape, with tapered ends of the respective cam elements 38 extending inwardly toward the longitudinal centerline 52.

Figure 5:
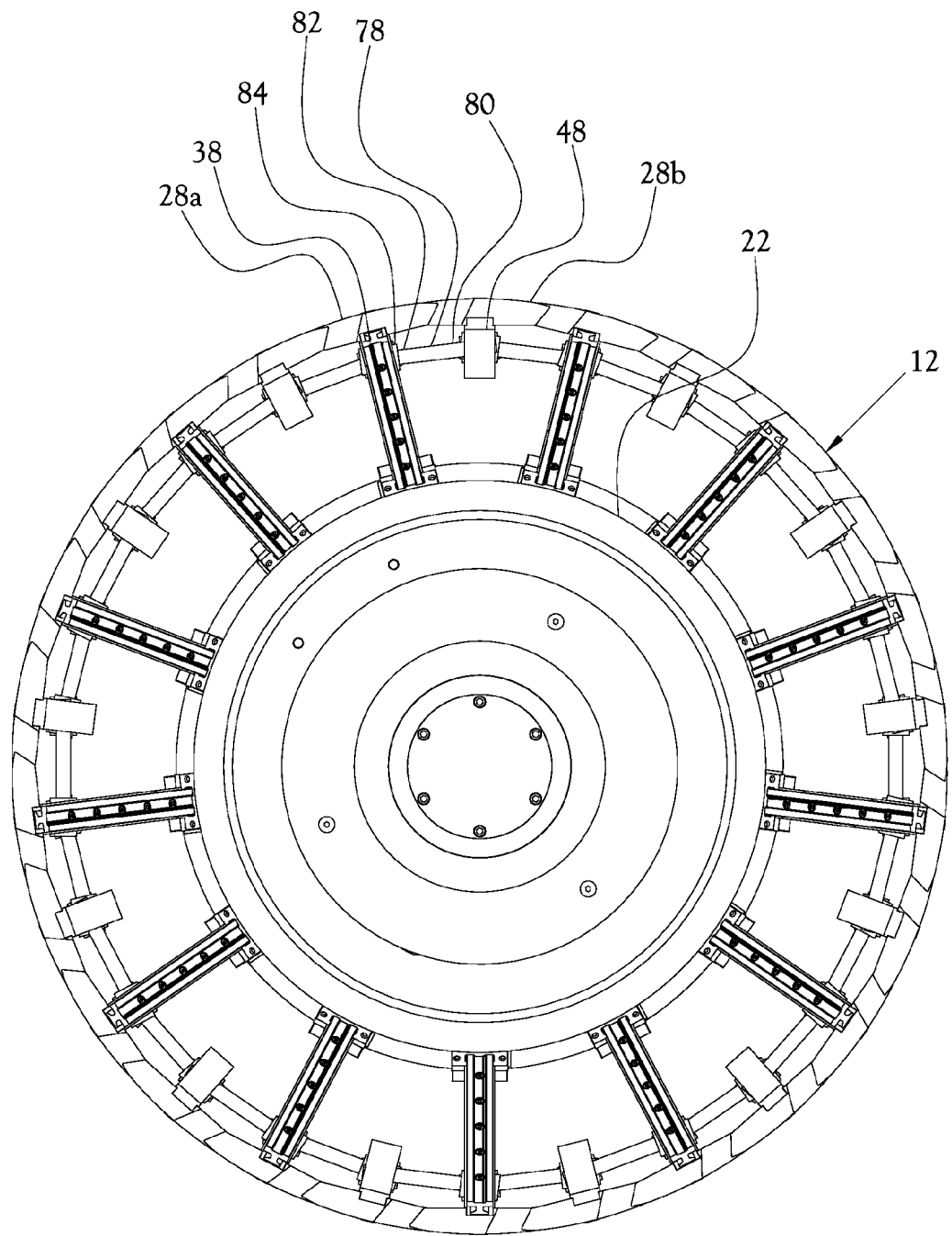
FIG. 5 is an end view of the expandable belt and tread drum of FIG. 1, showing the drum in an expanded position.

Similarly to the above-discussed segments 28a of the first set of segments, each segment 28b of the second set of segments is joined, as with the illustrated bolts 34, a weld, integral connection, or the like, to a block 48 disposed radially inwardly of the segment 28b. Each block 48 is linked to the cam elements 38 circumferentially adjacent the block 48 such that the block 48 is maintained circumferentially between its adjacent cam elements 38 as the cam elements 38 are moved radially toward and away from the longitudinal centerline 52 of the drum 10. Thus, throughout expansion and contraction of the outer circumferential working surface of the drum 10, the linkage of each block 48 to its circumferentially adjacent cam elements 38 maintains each segment 28b of the second set of segments in a substantially cylindrical configuration circumferentially between two adjacent segments 28a of the first set of segments. For example, in the illustrated embodiment, each block 48 defines a plurality of through bores 64, each of which is aligned axially with, and is thus in register with, a through bore 76 defined by a circumferentially adjacent cam element 38. As best shown in FIG. 5, for each pair of aligned through bores 64, 76 of each block 48 and adjacent cam element 38, a guide bar 78 is provided having a first end 80 fixedly secured within one of the through bores 64, 76 and an opposite second end 82 slidably received through the other of the through bores 64, 76. Each of the guide bars 78 is of a length selected to ensure that its second end 82 remains within its respective through bore throughout expansion and contraction of the drum 10. Thus, throughout expansion and contraction of the drum 10, each of the guide bars 78 serves to maintain its associated through bores 64, 76 in substantial registration with one another. Furthermore, for each of the guide bars 78 extending between any given block 48 and its adjacent cam elements 38, all such guide bars 78 extend to or from the block 48 at a common angle of extension in relation to a radial plane defined along the longitudinal centerline 52 of the drum 10 and extending radially-outward through a centerline of the block 48. In this configuration, throughout expansion and contraction of the drum 10, each block 48 is maintained circumferentially between its adjacent cam elements 38, and thus, each segment 28b of the second set of segments is maintained in a cylindrical configuration circumferentially between two adjacent segments 28a of the first set of segments.

It will be recognized that additional elements of the above-discussed linkage between the various blocks 48 and their adjacent cam elements 38 may be provided without departing from the spirit and scope of the present general inventive concept. For example, in several embodiments, for each through bore having a guide bar 78 slidably received therein, a bearing 84 is received within the through bore, surrounding the circumference of the guide bar 78. The bearing 84 may provide a snug, slidable relationship between each guide bar 78 and its associated block 48 or cam element 38, and may assist in maintaining axial alignment of the through bores 64, 76 associated with the guide bar 78. In some embodiments, for each guide bar 78 extending between associated through bores 64, 76 of adjacent blocks 48 and cam elements 38, a compression spring (not shown) may be provided, with each compression spring wrapping around its associated guide bar 78 and extending between the through bores 64, 76 associated therewith. Each compression spring may, in various embodiments, serve to bias the associated block 48 and cam element 38 circumferentially away from one another and radially away from the longitudinal centerline 52 of the drum 10, thereby assisting in maintaining the cylindrical arrangement of each of the segments 28a, 28b by maintaining each block 48 radially outward from the centerline 52 of the drum 10 and circumferentially between its adjacent cam elements 38.

As noted above, movement of the first and second end plates 20, 22 toward and away from one another results in adjustment of the overall diameter of the outer circumference of the drum 10. For example, FIGS. 1 and 3 depict the drum 10 at its fully collapsed, minimum circumference, with the first and second end plates 20, 22 separated from one another along the centerline 52 of the drum 10. By comparison, in FIGS. 2, 4, and 5, the drum 10 is depicted at an expanded circumference, with the first and second end plates 20, 22 drawn relatively close to one another. It will be recognized that the drum 10 may be expanded or collapsed to a large number of working circumferences, between and including a maximum expanded circumference and a minimum, fully collapsed circumference, and that the diameter of the outer working surface 12 of the drum 10 is infinitely adjustable within this range. It will further be recognized that additional elements of the adjustment mechanism 26, such as for example guide rails, shafts, and stops for guiding and limiting movement of the first and second end plates 20, 22, and springs and the like for biasing the drum 10 toward a desired expanded or collapsed position, may be provided. However, it will be understood that a complete description of such mechanisms is not necessary for a full understanding of the present general inventive concept.

Figure 6:
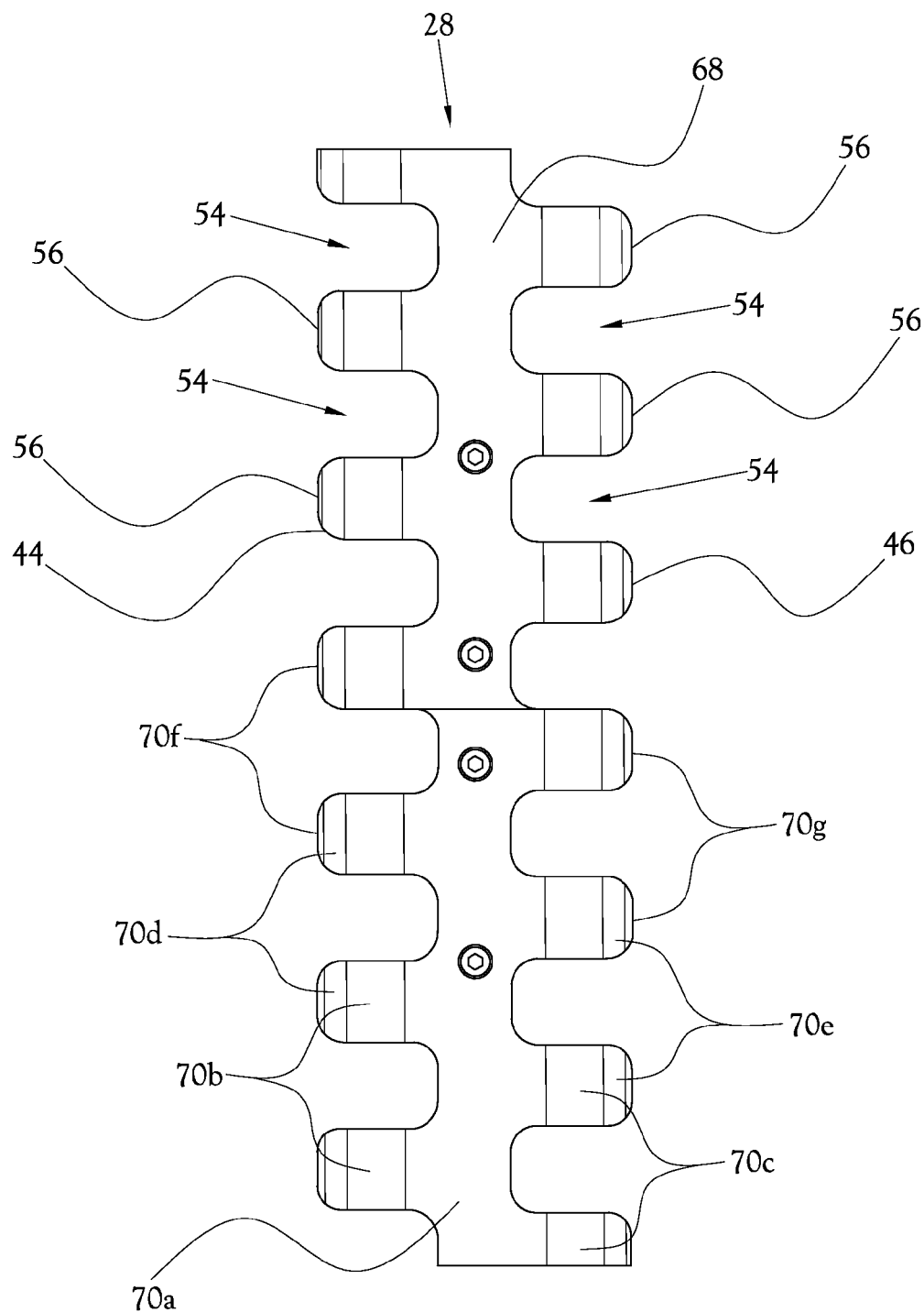
FIG. 6 is a top plan view showing one embodiment of a varied curvature segment for a belt and tread drum constructed in accordance with several features of the present general inventive concept.
Figure 7:
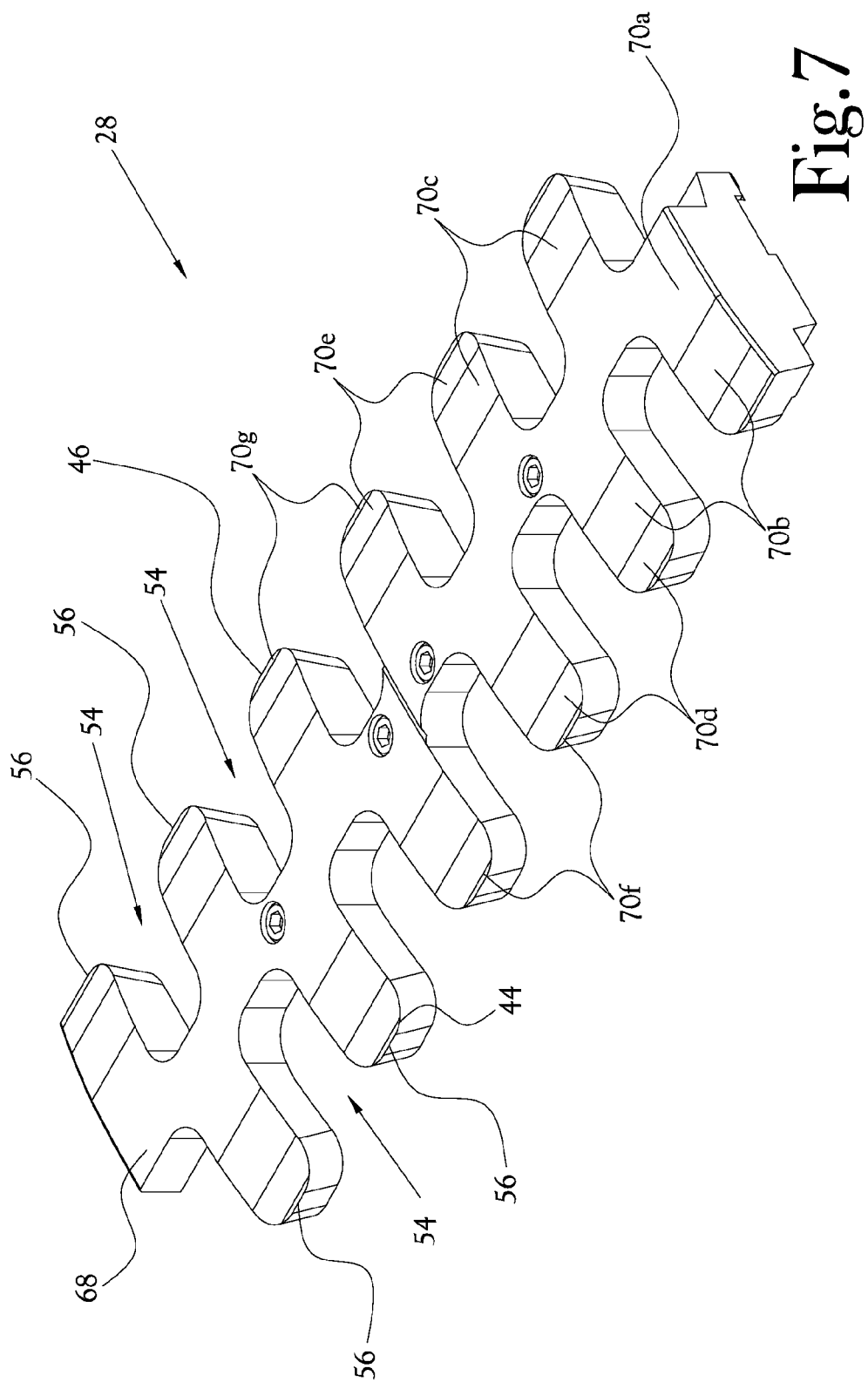
FIG. 7 is a perspective view of the segment of FIG. 6.

As discussed above, there is provided a plurality of the aforementioned arcuate, circumference-defining segments 28 disposed about the circumference of the drum 10. Each of the segments 28 defines a substantially arcuate outer surface 68, the cumulative effect of which is to define the overall outer circumferential working surface 12 of the drum 10. As best shown in FIGS. 6 and 7, each segment 28 of the depicted drum 10 includes first and second longitudinal side margins 44, 46. Each longitudinal side margin 44, 46 defines a plurality of fingers 56 extending along a circumferential dimension of the drum 10, with alternating circumferentially-extending slots 54 defined between the fingers 56. The fingers 56 of each segment 28 are sized and shaped to be received within, and to at least partially mate with, the slots 54 of an adjacent segment 28 in order to maintain a semi-continuous outer circumferential surface of the drum 10 throughout expansion and contraction of the drum 10. For example, in the expanded position of the drum 10 shown in FIGS. 2, 4, and 5, the fingers 56 of the several segments 28 are withdrawn (partially) from the slots 54 of respective adjacent segments 28. By comparison, in the fully collapsed position of the drum 10 shown in FIGS. 1 and 3, the fingers 56 of the several segments 28 are fully received within the slots 54 of respective adjacent segments 28.

In accordance with several features of the present general inventive concept, in various embodiments, each outer surface 68 of each segment 28 defines an arcuate shape having varying curvature along a circumferential dimension of the segment 28. More specifically, in various embodiments, each outer surface 68 of each segment 28 defines a plurality of circumferentially adjacent regions 70, with each region defining a radius of curvature which differs slightly from the radius of curvature of an adjacent region 70, such that the curvature of each outer surface 68 varies along the circumferential dimension of the segment 28. As will further be discussed hereinbelow, in various example embodiments, each of the regions 70 along the outer surface 68 of the each segment 28 may be used at various points throughout expansion and contraction of the drum 10 in cooperation with like regions of adjacent segments 28 to define one of a variety of partially expanded circumferences of the outer circumferential working surface 12 of the drum 10. In this way, the various segments 28 cooperate to define a relatively smooth outer working surface throughout expansion and collapse of the drum 10.

With reference to FIGS. 6 and 7, in the illustrated embodiment, each outer surface 68 of the illustrated segment 28 defines a first region 70a extending along the longitudinal dimension of the segment 28 at a circumferentially central location of the outer surface 68. The first region 70a defines an arcuate shape having a first radius of curvature corresponding to a first partially expanded diameter of the outer working surface 12 of the drum 10. In several embodiments, the first partially expanded diameter corresponds to a diameter of the outer working surface 12 of the drum 10 slightly more expanded than the above-discussed fully collapsed diameter, and corresponds generally to a minimum desirable working diameter of the outer working surface 12. In several embodiments, this minimum desirable working diameter of the drum 10 corresponds to the minimum diameter upon which the drum 10 may be expanded to allow a belt and tread package to be constructed along the outer working surface 12 of the drum 10, and also to allow the constructed belt and tread package to be removed from the drum 10 upon collapse of the drum 10 to the above-discussed fully collapsed diameter. However, it will be recognized that the first partially expanded diameter may correspond to other diameters of the outer working surface 12 of the drum 10, between and including the above-discussed maximum expanded circumference and the fully collapsed, minimum circumference of the drum 10, without departing from the spirit and scope of the present general inventive concept.

In the illustrated embodiment, the first region 70a extends from a longitudinal centerline of the segment outer surface 68 circumferentially outwardly along the segment 28, and terminates slightly circumferentially outward of the inward ends of the above-discussed slots 54. On either side of the first region 70a, and circumferentially adjacent thereto, the outer surface 68 defines second and third regions 70b, 70c, respectively. Each second region 70b extends longitudinally along the portions of the outer surface 68 defined by the central portions of those fingers 56 associated with the first side margin 44, and each third region 70c extends longitudinally along the portions of the outer surface 68 defined by the central portions of those fingers 56 associated with the second side margin 46. The second and third regions 70b, 70c each define an arcuate shape having a second radius of curvature corresponding to a second partially expanded diameter of the outer working surface 12 of the drum 10. In several embodiments, the second radius of curvature is greater than the first radius of curvature, such that the second diameter corresponds to a diameter of the outer working surface 12 of the drum 10 slightly more expanded than the above-discussed first diameter, but less than the diameter of the outer working surface 12 of the drum 10 in the drum's fully expanded configuration.

In the illustrated embodiment, the outer surface 68 further defines a fourth region 70d circumferentially outboard of, and adjacent to, the second region 70b. The fourth region 70d extends longitudinally along the portions of the outer surface 68 defined by the circumferentially outboard portions of those fingers 56 associated with the first side margin 44. Likewise, the outer surface 68 defines a fifth region 70e circumferentially outboard of, and adjacent to, the third region 70c. The fifth region 70e extends longitudinally along the portions of the outer surface 68 defined by the circumferentially outboard portions of those fingers 56 associated with the second side margin 46. The fourth and fifth regions 70d, 70e each define an arcuate shape having a third radius of curvature corresponding to a third diameter of the outer working surface 12 of the drum 10. In several embodiments, the third radius of curvature is greater than the first and second radii of curvature, such that the third diameter corresponds to a diameter of the outer working surface 12 of the drum 10 when the drum 10 is expanded to a greater diameter than the above-discussed first and second diameters. In certain embodiments, the third diameter may be selected to correspond to a maximum expanded diameter of the drum 10. However, it will be recognized that the third diameter may correspond to a partially expanded diameter of the drum 10 without departing from the spirit and scope of the present general inventive concept.

At circumferentially outboard ends of the segment 28, the outer surface 68 defines sixth and seventh regions 70f, 70g, respectively. The sixth region 70f extends circumferentially adjacent the fourth region 70d and is defined by the circumferentially outermost portions of those fingers 56 associated with the first side margin 44. Likewise, the seventh region 70g extends circumferentially adjacent the fifth region 70e and is defined by the circumferentially outermost portions of those fingers 56 associated with the second side margin 46. In the illustrated embodiment, the sixth and seventh regions 70f, 70g each define an arcuate shape having a fourth radius of curvature corresponding to a fourth diameter of the outer working surface 12 of the drum 10. In several embodiments, the fourth radius of curvature is less than the above-discussed third radius of curvature, such that the portions of the outer surface 68 defined by the circumferentially outboard ends of the segment 28 curve slightly radially inward, or at the very least do not extend as sharply radially outward, as compared to the above-discussed fourth and fifth regions 70d, 70e of the outer surface 68.

Referring again to FIG. 1, it will be recognized that, with the drum 10 in the fully collapsed position, the outer working surface 12 of the drum 10 defines a generally cylindrical shape. However, it will be understood that, due in part to the above-described varying curvatures along the various segments 28, the outer working surface 12 in this configuration is nonetheless slightly out of round. More specifically, in the present embodiment, each of the longitudinal side margins 44, 46 of the various segments 28 may project slightly radially outwardly of the general cylindrical shape of the drum 10, as compared to the portions of the segments 28 along the longitudinal centerlines thereof, when the drum 10 is in the fully collapsed position. As the drum 10 is expanded to the above-discussed first diameter, each of the first regions 70a of the segments 28 is brought into substantial conformity with the overall cylindrical shape of the outer working surface 12 of the drum 10. Furthermore, by expanding the overall diameter of the outer working surface 12, the amount by which the longitudinal side margins 44, 46 of the various segments 28 project radially outwardly of the overall cylindrical shape of the drum 10 is decreased. With reference to FIG. 2, as the drum 10 is further expanded to the above-discussed second diameter, each of the first regions 70a of the segments 28 is brought slightly out of conformity with the overall cylindrical shape of the outer working surface 12, while each of the second and third regions 70b, 70c of the segments 28 is brought into substantial conformity with the overall cylindrical shape of the outer working surface 12. It will be understood that, by further expanding the overall diameter of the outer working surface 12 of the drum 10, the amount by which the fourth and fifth regions 70d, 70e of the outer surfaces 68 of the segments 28 project radially outwardly of the overall cylindrical shape of the drum 10 is further decreased.

As the drum 10 is further expanded to the above-discussed third diameter, each of the first regions 70a of the segments 28 is brought further out of conformity with the overall cylindrical shape of the outer working surface 12, and each of the second and third regions 70b, 70c of the segments 28 is brought slightly out of conformity with the overall cylindrical shape of the outer working surface 12. At the same time, each of the fourth and fifth regions 70d, 70e of the segments 28 is brought into substantial conformity with the overall cylindrical shape of the outer working surface 12. Because the above-discussed sixth and seventh regions 70f, 70g of the outer surfaces 68 of the segments 28 each define a radius of curvature less than the above-discussed fourth and fifth regions 70d, 70e, it will be recognized that, with the drum 10 expanded to the third diameter, the sixth and seventh regions 70f, 70g do not contribute significantly to projection of the longitudinal side margins 44, 46 of the various segments 28 radially outwardly of the general cylindrical shape of the outer working surface 12 of the drum 10. However, in this configuration, each of the first, second, and third regions 70a, 70b, 70c of the segments 28 projects slightly radially inwardly of the general cylindrical shape of the drum 10.

In several embodiments, each of the various regions 70 along the circumferential dimension of each segment 28 defines a generally cylindrical curvature. In certain of these embodiments, the arcuate shapes of the various regions 70 are aligned substantially tangentially with one another, such that a relatively smooth transition is provided between the curvatures of each of the regions 70. In other embodiments, the outer surface 68 of each segment 28 may define a slight crease or ridge between each adjacent region 70, allowing for transition between the various curvatures of the regions.

In still other embodiments, the outer surface 68 of each segment 28 may define one or more transition curves, such as for example a spiral curve, parabolic curve, or the like, between the various regions 70. In these embodiments, each transition curve may provide a relatively smooth curvature between the respective arcuate shapes of adjacent regions. In still other embodiments, one or more of the various regions 70 along the circumferential dimension of each segment 28 may define a continuous transition curvature along its circumferential dimension. For example, in one embodiment, each of the first, fourth, and fifth regions 70a, 70d, 70e defines a generally cylindrical curvature, while each of the second and third regions 70b, 70c defines a transition curvature. In another embodiment, each outer surface 68 of each segment 28 defines a continuously varied transition curve along its circumferential dimension.

Figure 8:
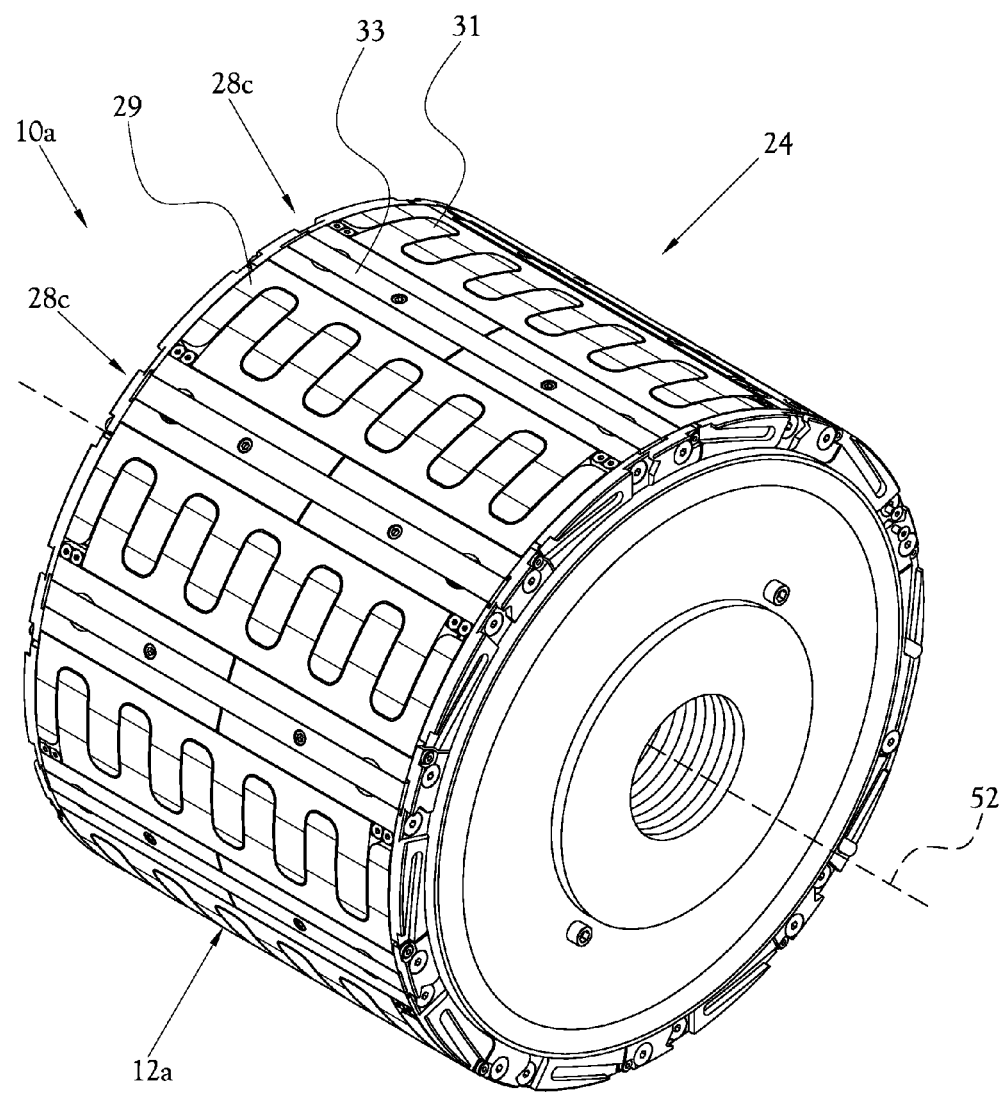
FIG. 8 is a perspective view of another embodiment of an expandable belt and tread drum with varied curvature segments constructed in accordance with several features of the present general inventive concept.
Figure 9:
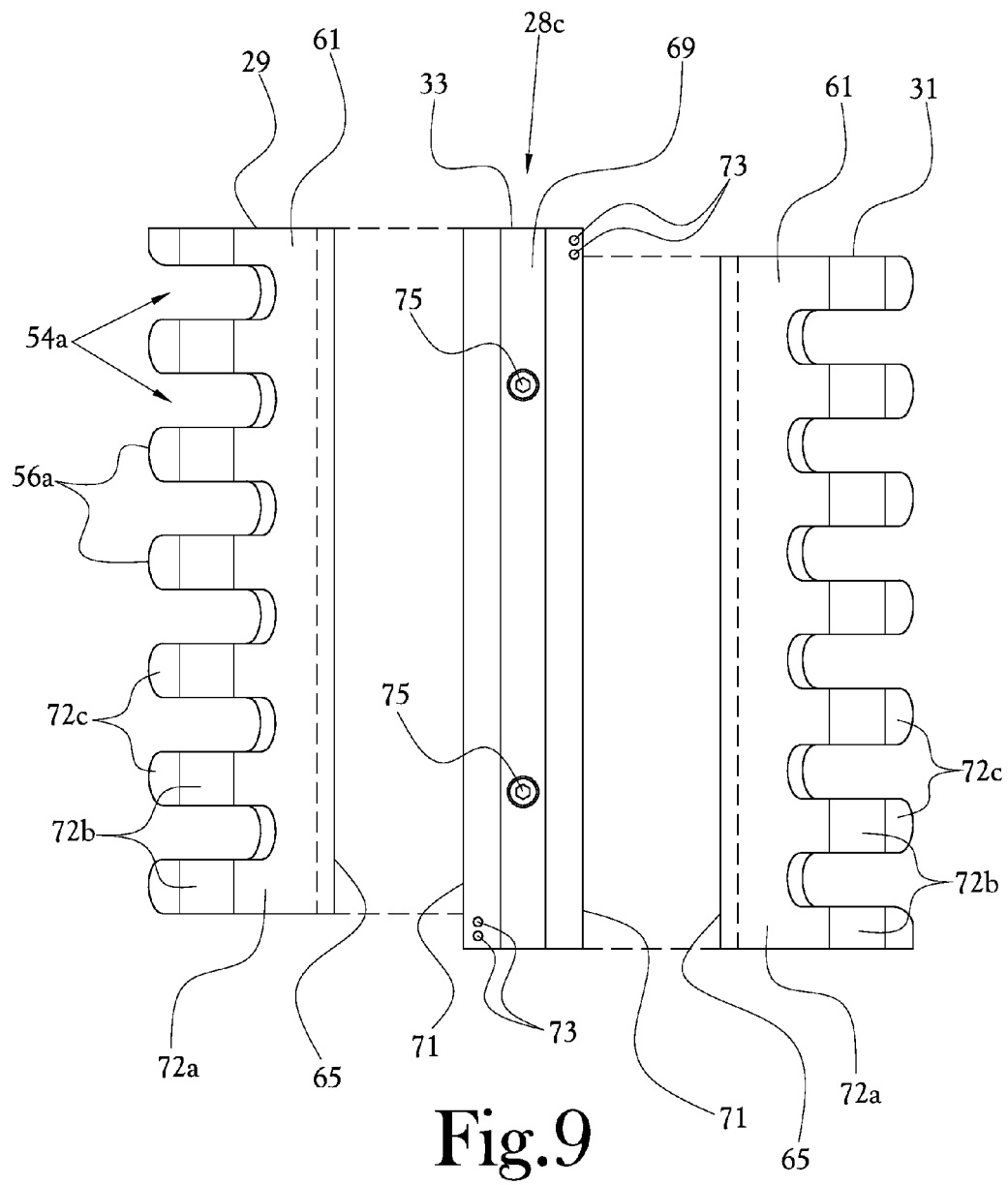
FIG. 9 is a top plan view showing another embodiment of a varied curvature segment for a belt and tread drum constructed in accordance with several features of the present general inventive concept.

FIG. 8 illustrates another embodiment of a drum 10a constructed in accordance with several features of the present general inventive concept. In the embodiment of FIG. 8, the body portion 24 of the depicted belt and tread drum 10a includes a plurality of circumference-defining, multi-sectioned segments 28c whose outer arcuate surfaces collectively define a portion of the outer circumferential working surface 12a of the drum 10a. As best shown in FIG. 9, each segment 28c of the depicted drum 10a includes a first side section 29, a second side section 31 and an intermediate section 33 disposed between the side sections 29 and 31. Each side section 29, 31 of each segment 28a defines a plurality of slots 54a along a circumferentially outer one of its longitudinal side margins. Defined between these slots 54a are alternating fingers 56a that are designed to be received within the slots 54a of the side section 29, 31 of an adjacent segment 28c. In FIG. 8, the drum 10a is again depicted in its collapsed position, at its minimum circumference, with the fingers 56a of the several segments 2c being received within the slots Ma of respective adjacent segments 28c.

With reference to FIG. 9, the intermediate section 33 extends along substantially the entire length of the drum 10a and includes an outer arcuate surface 69. Each side section 29, 31 extends along almost the entire longitudinal dimension of the drum 10a and defines an outer arcuate surface 61. In addition, each side section 29 and 31 includes a stepped marginal edge opposite the fingers 56a having a lip 65. Furthermore, each intermediate section 33 includes a stepped marginal surface extending along the circumferential sides thereof and which includes a lip 71. Each lip 65 of the side sections 29, 31 is arranged in overlying relationship, and is hingedly attached to, a corresponding lip 71 of the intermediate section 33 through an appropriate hinge connection (not shown). As depicted in FIG. 9, provided along one side of each lip 71 are a pair of internally-threaded openings 73 used in the hinged attachment of the intermediate section 33 to a corresponding one of the side sections 29, 31. Defined in the outer surface 66 of the intermediate section 33 and adjacent the ends thereof are through-bores 75 for accepting the bolts 34 with which the segment 28c is attached to a corresponding cam element.

Similarly to the above-discussed embodiment, in the embodiment of FIGS. 8 and 9, each outer surface 61 of each of the segments 28c defines an arcuate shape having varying curvature along a circumferential dimension of the segment 28c. More specifically, in the illustrated embodiment, each outer surface 61 of each of the side sections 29, 31 defines a plurality of circumferentially adjacent regions 72, with each region defining a radius of curvature which differs slightly from the radius of curvature of an adjacent region 72, such that the curvature of each outer surface 61 varies along the circumferential dimension of the segment 28. In the illustrated embodiment, each of the outer surfaces 61 of the side sections 29, 31 defines a first region 72a extending along a circumferentially inner-most portion of the outer surface 61, adjacent the intermediate section 33. A second region 72b is defined circumferentially outwardly from, and adjacent to, each first region 72a, and a third region 72c is defined circumferentially outwardly from, and adjacent to, each second region 72b. In the illustrated embodiment, each first region 72a defines an arcuate shape having a first radius of curvature corresponding to a first partially expanded diameter of the outer working surface 12a of the drum 10a. Each second region 72b defines an arcuate shape having a second radius of curvature corresponding to a second partially expanded diameter of the outer working surface 12a of the drum 10a, the second diameter being greater than the first diameter, but less that the fully expanded, maximum diameter of the working surface 12a of the drum 10a. Each third region 72c defines an arcuate shape having a third radius of curvature corresponding to a third diameter of the outer working surface 12a of the drum 10a. Similarly to the above-discussed embodiment, in the illustrated embodiment, the third diameter is selected to correspond to a maximum expanded diameter of the outer working surface 12a of the drum 10a. However, it will be recognized that the third diameter may correspond to a partially expanded diameter of the drum 10a without departing from the spirit and scope of the present general inventive concept.

Figure 10:
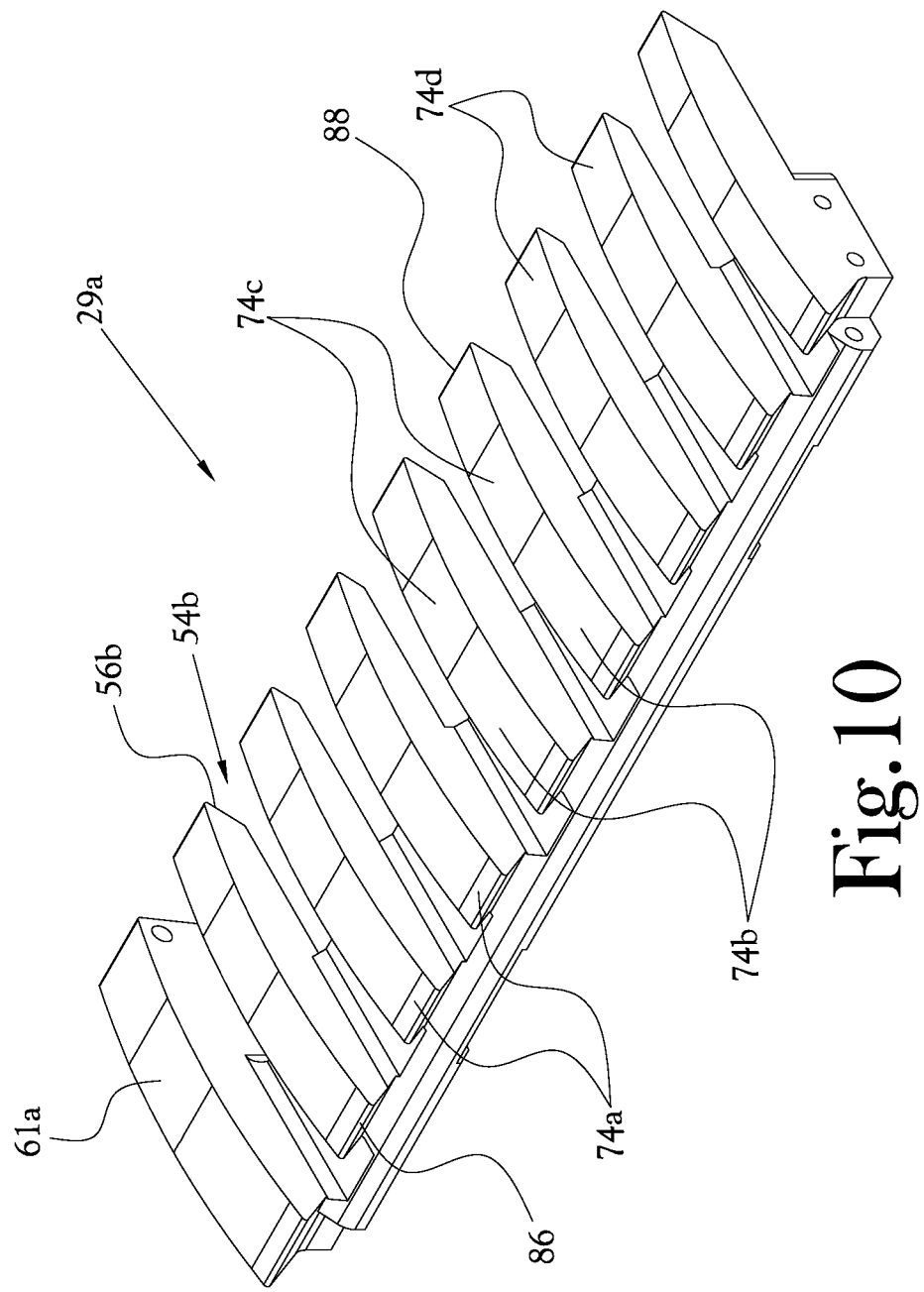
FIG. 10 is a perspective view showing another embodiment of a varied curvature segment for a belt and tread drum constructed in accordance with several features of the present general inventive concept.

FIG. 10 illustrates another embodiment of a side section 29a for use in constructing a multi-sectioned segment of the type described above. In the embodiment of FIG. 10, the side section 29a defines a plurality of alternating fingers 56b and slots 54b extending along a longitudinal dimension thereof. Each of the fingers 56b projects radially outwardly from the remainder of the side section 29a, such that the side section 29a has an outer surface 61a which is cooperatively defined by the various fingers 56b.

In the embodiment of FIG. 10, the outer surface 61a defines a first region 74a extending along a circumferentially inboard end 86 of the section 29a. A second region 74b is defined by the outer surface 61a circumferentially outwardly from, and adjacent to, the first region 74a. Likewise, a third region 74c is defined circumferentially outwardly from, and adjacent to, the second region 74b, and a fourth region 74d is defined circumferentially outwardly from, and adjacent to, the third region 74c. In the illustrated embodiment, the second region 74b defines an arcuate shape having a first radius of curvature corresponding to a first partially expanded diameter of the outer working surface 12a of the drum 10a. The third region 74c defines an arcuate shape having a second radius of curvature corresponding to a second partially expanded diameter of the outer working surface 12a of the drum 10a, the second diameter being greater than the first diameter, but less that the fully expanded, maximum diameter of the working surface 12a of the drum 10a. The fourth region 74d defines an arcuate shape having a third radius of curvature corresponding to a third diameter of the outer working surface 12a of the drum 10a. Similarly to the above-discussed embodiments, in the illustrated embodiment, the third diameter is selected to correspond to a maximum expanded diameter of the outer working surface 12a of the drum 10a. However, it will be recognized that the third diameter may correspond to a partially expanded diameter of the drum 10a without departing from the spirit and scope of the present general inventive concept.

In several embodiments similar to the illustrated embodiment, the first region 74a defines an arcuate shape having a radius of curvature greater than the radius of curvature of the second region 74b. For example, in the illustrated embodiment, the first region 74a defines an arcuate shape having a radius of curvature conforming substantially to the above-discussed third radius of curvature, that is, having a radius of curvature similar to the radius of curvature of the fourth region 74d and corresponding to the third diameter of the outer working surface 12a of the drum 10a. In various embodiments, the relatively large radius of curvature of the first region 74a, arranged in tangential relationship with the relatively small radius of curvature of the second region 74b, allows the first region 74a to provide a curved portion of the segment which serves as a transition curve between the relatively flat, or slightly curved, outer surface 69 of the intermediate portion 33 of the segment and the second region 74b of the side section 29a. In various embodiments, each of the inner and outer edges 86, 88 of each of the fingers 56b of the side section 29a further defines a chamfered, beveled, or filleted edge, so as to limit protrusion of the outer edges 86, 88 of the fingers 56b beyond the general cylindrical shape of the outer working surface 12a of the drum 10a throughout expansion and collapse of the drum 10a.

From the foregoing description, it will be recognized by those skilled in the art that a belt and tread drum has been provided which incorporates varied curvatures of the outer surfaces of segments forming an outer circumference of the drum in order to reduce the deviation from the general cylindrical shape of the outer working surface of the drum throughout the range of expansion and contraction of the drum. It is noted that the simplified diagrams and drawings do not illustrate all the various connections and assemblies of the various components, however, those skilled in the art will understand how to implement such connections and assemblies, based on the illustrated components, figures, and descriptions provided herein, using sound engineering judgment. Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. However, while the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A tire building drum having a segment defining a portion of an outer circumferential working surface of a tire building drum, the segment configured as a single section having a rigid and fixed arcuate outer surface defining a circumferential dimension, the outer surface having a plurality of regions, each region extending along a longitudinal dimension of the segment, each region having a curvature along a circumferential dimension of the segment that differs from a curvature of an adjacent region, the outer surface defining opposite first and second side margins extending along the longitudinal dimension, each side margin defining a plurality of fingers and slots, each finger being sized and shaped to at least partially mate with a corresponding slot of an adjacent segment, the plurality of regions comprising a first region extending along a circumferentially central portion of the segment, the first region having a first radius of curvature and the plurality of regions further comprising a second region defined by the fingers of the first side margin and extending circumferentially adjacent the first region, the second region having a second radius of curvature greater than the first radius of curvature.

2. The tire building drum of claim 1, the plurality of regions further comprising a third region extending circumferentially adjacent the first region opposite the second region, the third region having a radius of curvature substantially the same as the second radius of curvature.

3. The tire building drum of claim 2, the plurality of regions further comprising a fourth region extending circumferentially adjacent the second region opposite the first region, the fourth region having a third radius of curvature greater than the second radius of curvature.

4. The tire building drum of claim 3, the plurality of regions further comprising a fifth region extending circumferentially adjacent the third region opposite the first region, the fifth region having a radius of curvature substantially the same as the third radius of curvature.

5. The tire building drum of claim 4, the plurality of regions further comprising a sixth region extending circumferentially adjacent the fourth region opposite the second region, the sixth region having a fourth radius of curvature less than the third radius of curvature.

6. The tire building drum of claim 5, the plurality of regions further comprising a seventh region extending circumferentially adjacent the fifth region opposite the third region, the seventh region having a radius of curvature substantially the same as the fourth radius of curvature.

7. The tire building drum of claim 6, wherein each region extends tangentially to an adjacent region.

8. The tire building drum of claim 6, wherein each region defines a transition curve along an interface of the region with an adjacent region, each transition curve providing a smooth transition between the radius of curvature of that region and the radius of curvature of the adjacent region.

9. The tire building drum of claim 6, wherein each side margin defines a plurality of alternating slots and fingers extending along the circumferential dimension.

10. The tire building drum of claim 9, wherein the second, fourth, and sixth regions are defined by the fingers of the first side margin, and wherein the third, fifth, and seventh regions are defined by the fingers of the second side margin.

11. A belt and tread drum for use in the manufacture of vehicle tires comprising:
a plurality of segments mounted in side-by-side relationship about a central axis for radial movement inwardly and outwardly with respect to the central axis, each segment configured as a single section defining a rigid and fixed arcuate working surface, the working surfaces collectively defining a circumferential working surface of the drum, each working surface having varied curvature along a circumferential dimension of the working surface, wherein each working surface defines opposite first and second side margins extending along a longitudinal dimension of the working surface, each side margin defining a plurality of alternating slots and fingers extending along the circumferential dimension of the working surface, each finger of each first side margin being sized and shaped to at least partially mate with a corresponding slot of a second side margin of an adjacent segment, and each slot of each the first side margin being sized and shaped to at least partially mate with a corresponding finger of a second side margin of an adjacent segment, each working surface defining a plurality of regions, each region extending along a longitudinal dimension of the working surface, each region having a curvature along the circumferential dimension of the working surface that differs from a curvature of an adjacent region, each plurality of regions of each working surface comprising a first region extending along a circumferentially central portion of the working surface and a second region defined by the fingers of the first side margin and extending circumferentially adjacent the first region, the first region having a first radius of curvature and the second region having a second radius of curvature greater than the first radius of curvature.

12. The belt and tread drum of claim 11, each plurality of regions of each working surface further comprising a third region extending circumferentially adjacent the first region opposite the second region, the second and third regions having the second radius of curvature greater than the first radius of curvature.

13. The belt and tread drum of claim 12, each plurality of regions of each working surface further comprising a fourth region extending circumferentially adjacent the second region opposite the first region, and a fifth region extending circumferentially adjacent the third region opposite the first region, the fourth and fifth regions having a third radius of curvature greater that the second radius of curvature.

14. The belt and tread drum of claim 13 each plurality of regions of each working surface further comprising a sixth region extending circumferentially adjacent the fourth region opposite the second region and a seventh region extending circumferentially adjacent the fifth region opposite the third region, the sixth and seventh regions having a fourth radius of curvature less than the third radius of curvature.

15. The belt and tread drum of claim 14, wherein each working surface defines a smooth transition between each of the plurality of regions of the working surface.

16. The belt and tread drum of claim 15, wherein the second, fourth, and sixth regions of each working surface are defined by the fingers of the first side margin of the working surface, and wherein the third, fifth, and seventh regions of each working surface are defined by the fingers of the second side margin of the working surface.

* * * * *